United States Patent [19]

Jacobsen

[11] Patent Number: 4,705,600

[45] Date of Patent: Nov. 10, 1987

[54] METHOD FOR THE TREATMENT OF PULP WITH LIQUID

[75] Inventor: Finn Jacobsen, Karlstad, Sweden

[73] Assignee: Kamyr AB, Karlstad, Sweden

[21] Appl. No.: 747,873

[22] Filed: Jun. 24, 1985

Related U.S. Application Data

[63] Continuation of Ser. No. 477,854, Mar. 22, 1983, abandoned.

[30] Foreign Application Priority Data

Mar. 29, 1982 [SE] Sweden ................. 8201973

[51] Int. Cl.$^4$ ................. D21C 9/02; D21C 9/04
[52] U.S. Cl. ................. 162/19; 68/181 R; 162/37; 162/40; 162/47; 162/60; 162/89
[58] Field of Search ............ 162/19, 88, 89, 249, 162/250, 251, 60, 47, 40, 37; 68/181 R; 8/156

[56] References Cited

U.S. PATENT DOCUMENTS

| | | | |
|---|---|---|---|
| 1,933,609 | 11/1933 | Wagner | 141/12 |
| 3,348,390 | 10/1967 | Richter | 68/181 R |
| 3,372,087 | 3/1968 | Richter | 68/181 R |
| 3,655,505 | 4/1972 | Yorston et al. | 162/88 |
| 3,698,995 | 10/1972 | Rapson | 162/19 |
| 3,938,206 | 2/1976 | Stranger-Johannessen | 8/156 |
| 4,041,560 | 8/1977 | Jacobsen | 68/181 R |
| 4,046,621 | 9/1977 | Sexton | 162/40 |
| 4,310,384 | 1/1982 | Meredith et al. | 162/60 |
| 4,368,628 | 1/1983 | Jacobsen | 8/156 |

FOREIGN PATENT DOCUMENTS 0980959 1/1976 Canada ................. 162/88

OTHER PUBLICATIONS

Gullichsen, "Displacement Bleaching-Past, Present, Future", Tappi, Dec. 1979, vol. 62, No. 12.
Kamyr, Publication "Displacement Bleaching", Jan. 1978.

*Primary Examiner*—Steve Alvo
*Attorney, Agent, or Firm*—Nixon & Vanderhye

[57] ABSTRACT

A method for the treatment of a suspension, such as pulp, with one or more treatment liquids in a manner that maximizes treatment efficiency and minimizes heat loss. The pulp flows in a flow path confined to a given web thickness, and has first and second opposite sides. Treatment liquid is added to the first side of the flow path at spaced predetermined points along its length. Liquid displaced by the treatment liquid is withdrawn from the second side of the flow path at substantially the predetermined points. The displaced liquid at the first predetermined point along the flow path consists essentially of original suspension liquid, while the liquid fraction of the pulp past the last predetermined point of the flow path is composed mainly of treatment liquid added at the last predetermined point. Treatment can be accomplished at super-atmospheric pressure and at a temperature above 100° C. The web thickness is between about 50-500 mm., and the pulp concentration is between about 7-15 percent and is maintained substantially constant throughout treatment.

19 Claims, 5 Drawing Figures

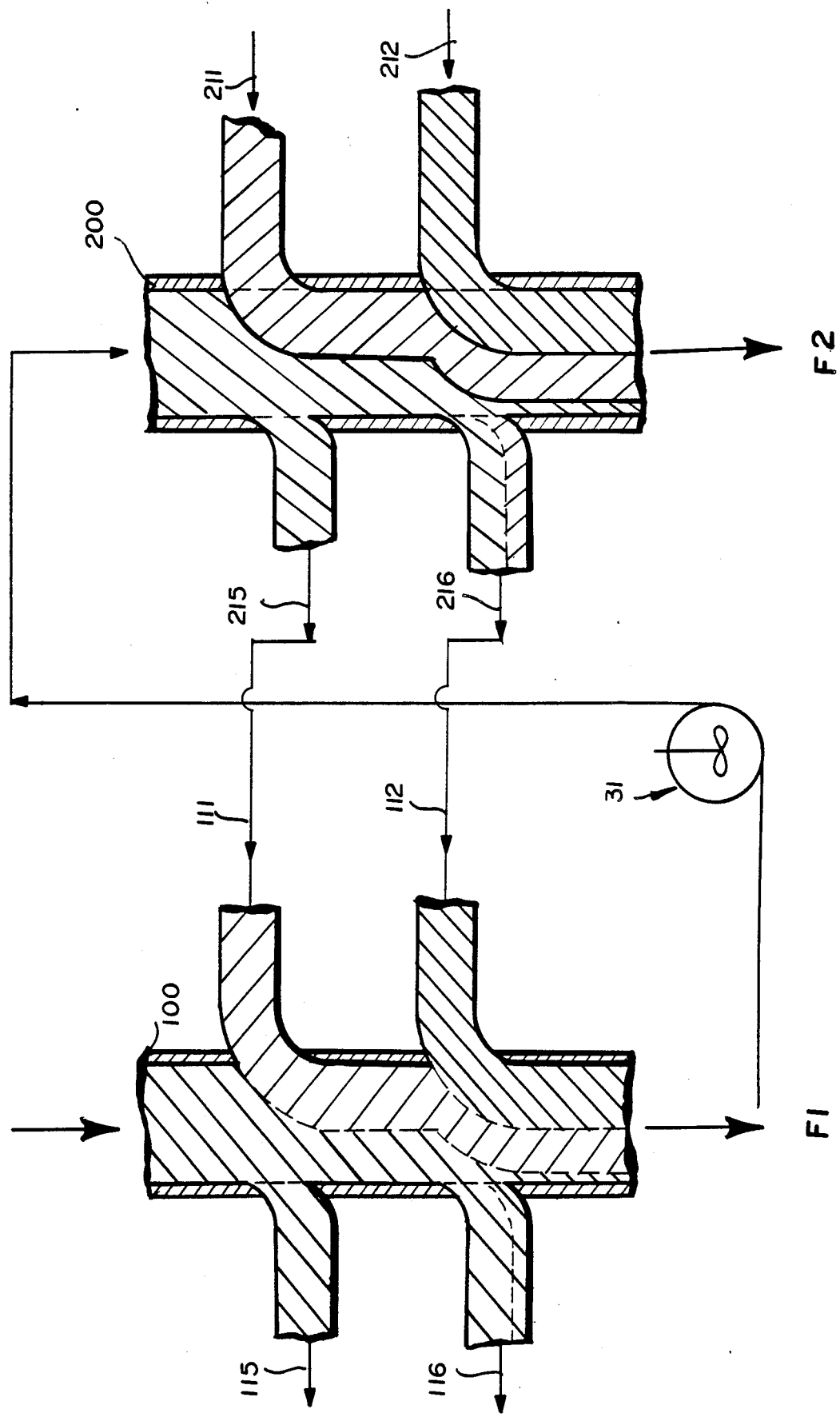

METHOD FOR THE TREATMENT OF PULP WITH LIQUID

This is a continuation of application Ser. No. 477,854 filed Mar. 22, 1983, now abandoned.

BACKGROUND AND SUMMARY OF THE INVENTION

The invention relates to a method for treating a suspension with one or more treatment liquids in order to maximize treatment efficiency and minimize heat loss. The invention is particularly applicable for the treatment of comminuted cellulosic fibrous suspensions (hereinafter "pulp"), particularly for the washing and bleaching of pulp.

In modern closed pulp mills the concentration of the pulp is maintained substantially constant throughout the entire treatment process, i.e. at a concentration of between about 7–15 percent. This is made possible by the utilization of continuous diffusers, which may be of the open type (such as shown in U.S. Pat. No. 3,372,087) or the pressure type (such as shown U.S. Pat. No. 4,368,628).

According to the present invention basic attributes of such diffusers are taken advantage of so as to provide a method of pulp treatment which has maximum efficiency, and with minimized heat loss. According to the method of the present invention, the pulp is caused to flow through a continuous diffuser type structure with a predetermined web thickness, preferably between about 50–500 mm, the flow path having first and second opposite sides. Treatment liquid is added to the pulp flowing in the flow path at a plurality of spaced predetermined points along the first side, while liquid displaced by the added treatment liquid is withdrawn from the flow path at substantially such predetermined points along the second side. The displaced liquid withdrawn from the first predetermined point consists essentially of original suspension liquid, while the liquid fraction of the pulp in the flow path past the last predetermined point preferably comprises mainly treatment liquid added at the last predetermined point. The concentration of the pulp is maintained substantially constant throughout treatment, preferably at a concentration between about 7–15 percent.

The pulp can be caused to flow in a number of series connected flow paths during treatment, with interconnections as desired in order to effect maximum efficiency of the treatment, depending upon the particular treatment being practiced (e.g. bleaching and/or washing), pressure, and temperature conditions, etc.

It is the primary object of the present invention to effect the continuous treatment of a suspension with one or more treatment liquids with maximum efficiency of treatment, and with minimal heat loss. These and other objects of the invention will become clear from an inspection of a detailed description of the invention, and from the appended claims.

BRIEF DESCRIPTION OF THE DRAWINGS

FIG. 2 is a side schematic sectional view of two series-connected vessels in which a treatment method according to the present invention is practiced.

DETAILED DESCRIPTION OF THE DRAWINGS

Figure 1A:
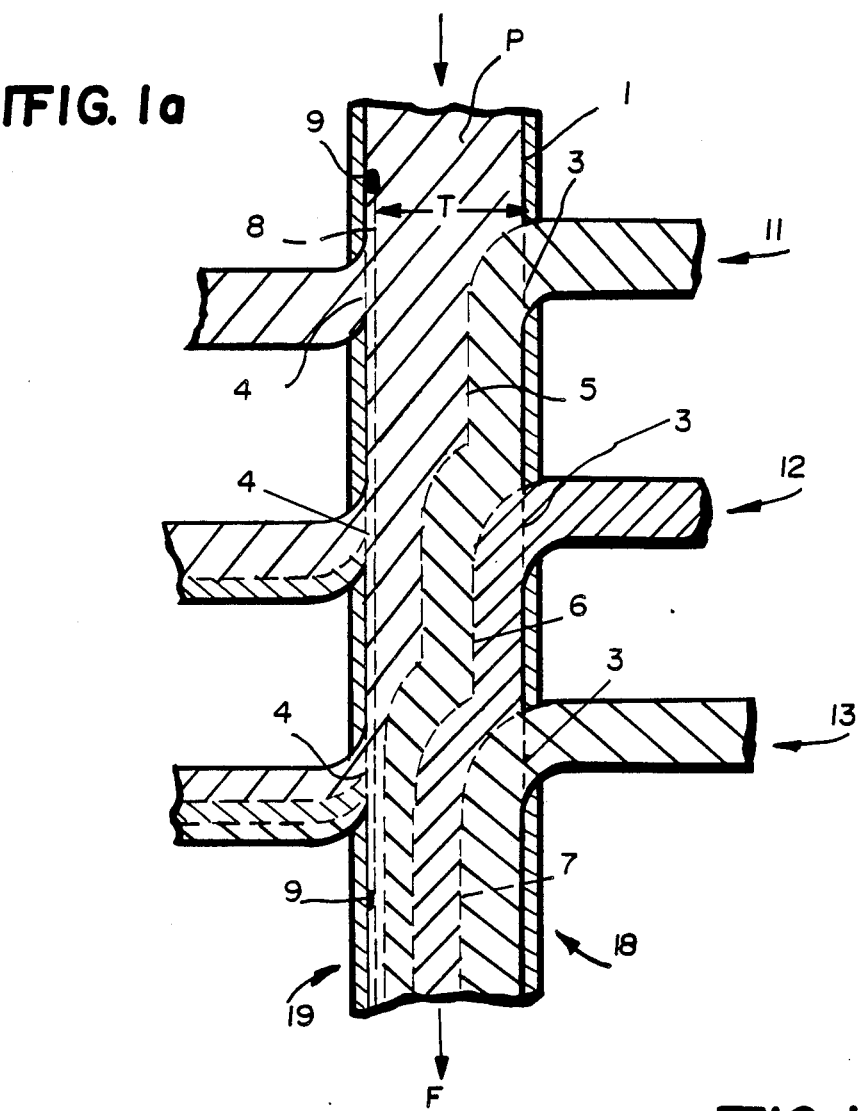
FIG. 1a is a schematic side cross-sectional view of a vessel in which a treatment method according to the present invention is being practiced, with sharp liquid displacement fronts being illustrated for clarity of understanding.

A suspension, such as pulp P, is caused to flow in a flow path F in FIG. 1a in a continuous diffuser, the diffuser being illustrated schematically by reference numeral 1. The vessel 1 confines the pulp P so that flows in the form of a web having a predetermined constant thickness T, which in the case of pulp is between about 50–500 mm. The flow path F includes a first side, indicated generally by reference numeral 18, and a second side indicated generally by reference numeral 19. The path F is substantially vertically downwardly.

At a plurality of predetermined points along the length of the flow path F treatment liquid is added at one side of the pulp P, and displaced liquid is withdrawn from the other side. That is, in FIG. 1a at the spaced predetermined points 11, 12, and 13 along the flow path F a treatment liquid is introduced into the web of pulp P at the first side 18 thereof. The treatment fluid is introduced through a suitable structure for allowing uniform introduction thereof over a large area, such as through screens 3. The fluids 11–13 may be any suitable treatment liquids, such as wash water or bleaching liquid in the case of pulp, and the same or different liquids may be added at the points 11–13.

Liquid displaced from the pulp P at the second side 19 of the flow path F is withdrawn through screen 8 at spaced predetermined points 4 at substantially the same positions along the flow path F as the treatment fluid introduction points 11–13. In order to make withdrawal as efficient as possible, preferably the screen 8 is reciprocated along the length of the container 1 with sliding seals 9 providing sealing engagement with the interior wall of the container 1, reciprocation being effected in the same general manner as shown in U.S. Pat. Nos. 4,041,560 and 4,368,628.

The withdrawn liquid 15 at the first predetermined point along the flow path F consists essentially of original suspension liquid. The withdrawn liquids 16, 17 also contain treatment liquids added at points 11, 12.

By adding and withdrawing liquid from the pulp P in the manner described above, and schematically illustrated in FIG. 1a, it is possible to obtain extremely sharp displacement fronts 5, 6, and 7 between the various liquid components. That is the front 5 is between the original suspension liquid and the treatment liquid added at point 11, the front 6 is between the treatment liquids added at points 11 and 12, and the front 7 is between the treatment liquids added at points 12 and 13. Essentially no inter-mixing between the various liquid fractions takes place. The method can be practiced so that an adequate quantity of treatment liquid is added at point 13 so that the pulp P flowing in the flow path F downstream of the point 13 comprises mainly treatment liquid added at point 13.

Figure 1B:
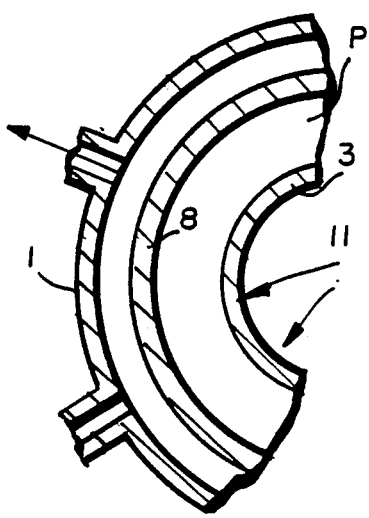
FIGS. 1b and 1c are top, partial, schematic cross-sectional views of two different configurations of flow paths of treatment and withdrawal liquids, and showing an annular cross-section of a pulp flow path.
Figure 1C:
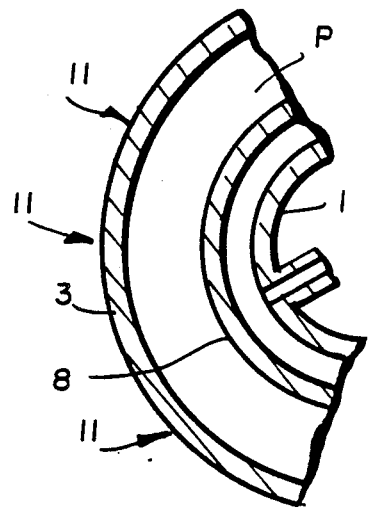

If desired, the flow path F can be annular in cross-section as illustrated schematically in FIGS. 1b and 1c.

In FIG. 1b the treatment liquids and the withdrawn liquids pass radially outwardly, while in FIG. 1c the treatment liquids and withdrawn liquids pass radially inwardly.

If desired, it is possible to space the points 11–13 and control the flows at points 11–13 to obtain almost any desired stratification and flow pattern of liquid fraction within the suspension flow path F. The extractions can also be controlled to achieve desired results.

While the method according to the invention can be practiced at atmospheric pressures, it also is readily practiced at super-atmospheric pressure, and the treatment liquids, and the entire process, can be at a temperature above 100° C. if required.

FIG. 2 schematically illustrates the first and second flow paths F1, F2 of a suspension, which are connected in series by conduit 30. Pulp flows in first container 100 in flow path F1 past predetermined points 111, 112, with withdrawal taking place as indicated by arrows 115, 116 at substantially the same position along the flow path F1 as the liquid introduction points 111, 112. While flowing in conduit 30 the pulp is preferably mixed. Such mixing may take place naturally in the series connection between two continuous diffusers (particularly if pressure diffusers) or if necessary an accessory mixing device 31 of conventional design may be employed. The flow paths F1, F2 preferably are both vertically downwardly. The liquid withdrawn, as indicated by arrow 215, from the first predetermined point along the second flow path is preferably the treatment liquid at the first predetermined point 111 along the first flow path F1. Similarly the liquid withdrawn as indicated by arrow 216 at the second predetermined point along path F2 is the treatment liquid at the second predetermined point 112 along first flow path F1. In a typical pulp treating system, the strong liquid withdrawn at arrow 115 could normally be led back to a preceding treatment stage (since it would contain used black liquor), or it could be passed to a chemical recovery plant. The weak liquid withdrawn as indicated by arrow 116 would be useful as dilution liquid, such as in a continuous oxygen delignification reactor. The liquid added at point 211 could, in a wash system, consist of weak hot cooking liquor or condensate, and liquid 212 could consist of clean water of moderate temperature.

If the containers 100 and 200 are part of a bleaching system a first chemical suspension liquid therein may be displaced by liquid 111, with another chemical content, and the liquid 111 can later be displaced by the liquid 112, which has been refreshed with new chemicals, has another chemical composition, or comprises a suitable wash liquid such as water. Where the last treatment liquid 112 consists of a chemical in a bleaching sequence it is particularly desirable that the pulp be mixed before—after a suitable retention—it flows to container 200. In container 200 continued treatment takes place in a like manner.

It is also possible to heat pulp which passes downwardly through the container 100. This may be accomplished by providing the first treatment liquid 111 as a warm liquid, and the second treatment liquid 112 as a warmer liquid. The pulp when it discharges the device 100 will have had most of the original suspension liquid displaced therefrom, and will contain a high percentage of the warmest liquid. By suitably varying the temperatures of the liquids 111, 112 any desired heating can be accomplished.

While it is desirable to keep the concentration of pulp substantially constant during the practice of the method of the present invention, in practical operation normally the volume of the treatment liquid is very nearly identical to the volume of the extracted liquid, so that no dilution occurs.

Figure 3:
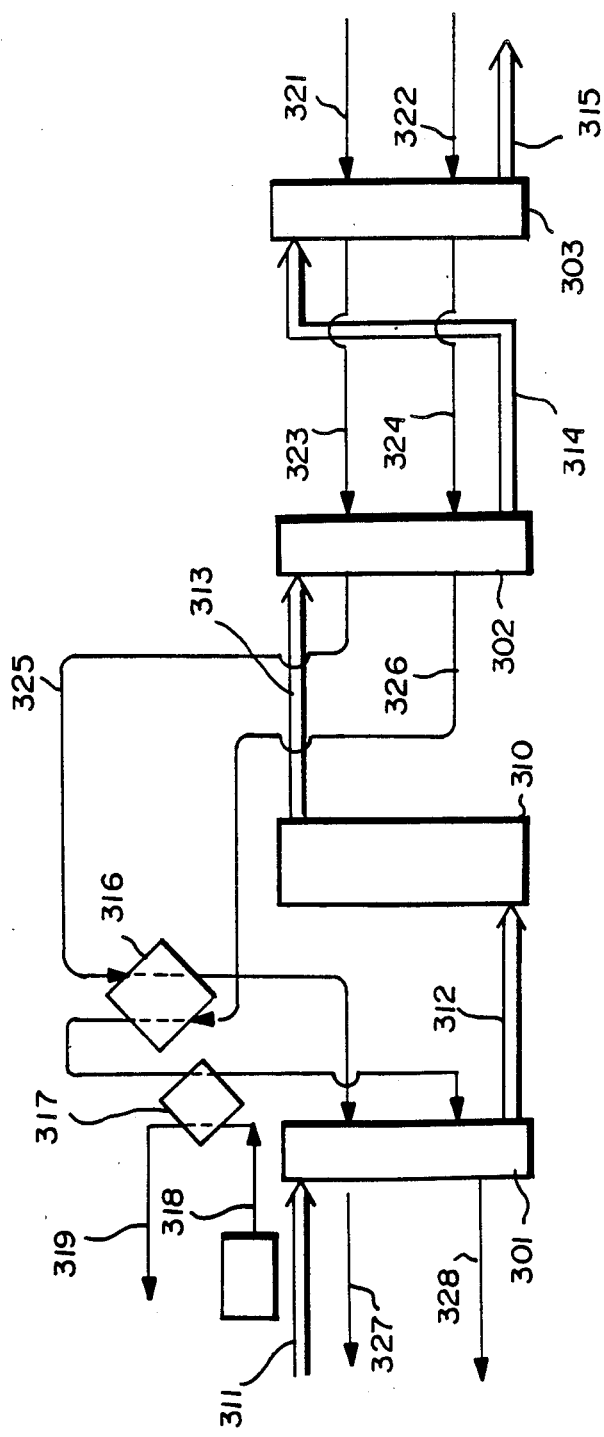
FIG. 3 is a schematic view showing the inter-connection between various vessels for the practice of a complete treatment method according to the present invention.

FIG. 3 schematically illustrates a complete wash system for the practice of the method according to the present invention. Three pressure diffusers are illustrated, 301, 302, 303, and a single reaction vessel 310. A pair of heat exchangers 316, 317 are provided as well as pulp lines 311–315. Liquid conduits 321–328 also are provided, as well as a steam conduit 318 from a steam source, and a condensate conduit 319. For simplicity of illustration no pumps are illustrated in FIG. 3, although pumps may be provided where necessary or desirable.

Pulp in line 311 typically is at a concentration of about 10 percent, having been discharged from a continuous pulp digester or the like. It is at a pressure sufficient to effect flow through the diffuser 301 and reaction vessel 310, and provide sufficient pressure in the discharge line 313 from vessel 310 to flow through diffusers 302, 303. The pulp is washed in diffuser 301, and heated while it is washed.

The liquid extracted in line 327 contains a relatively high concentration of dry solids and preferably is led back to the digester wash zone, while the relatively weaker extraction liquid 328 is piped to the discharge zone of digester. The vessel 301 thus can efficiently wash the pulp and also isolates the digester from the subsequent treatment apparatus.

The vessel 310 may be an oxygen treatment vessel held at super-atmospheric pressure, and at a high temperature (e.g. greater than 100° C.).

The treatment liquids 321 and 322 supplied to the diffuser 303 preferably comprise water, and the liquids 321 and 322 can be of different temperatures so that when the pulp is charged through line 315 it is at the desired temperature. Extraction liquid in line 325 has substantially the same temperature as the pulp when it leaves the tower 310, and is passed through the heat exchanger 316 in order to heat the liquid in line 326 prior to its introduction into diffuser 301. A small quantity of low pressure steam may be added through line 318 to the heat exchanger 317 to effect additional heating of the liquid in line 326 in order to heat the pulp in diffuser 301 to the desired temperature.

In the utilization of a conventional wash system for washing of pulp having a concentration of about 10 percent, 66 kgs of steam per ton of pulp is necessary in order to effect proper heating. In the practice of the invention, however, for pulp with the same concentration and where the ratio of the temperature of the pulp at the vessel inlet minus the temperature at the vessel outlet to the temperature of the pulp at the vessel inlet minus the temperature of the treatment liquid is 0.90, and the ratio of the added liquid quantity per kilogram of dry pulp entering the vessel to the liquid quantity per kilogram of dry pulp leaving the vessel is 1.2, steam consumption can be reduced to 39 kgs per ton of pulp. That is a heat energy reduction of about 40 percent is possible. Yet in practicing the invention it is still possible to reach an inlet temperature of 95° C. in the reactor 310 with a pulp inlet temperature of 70° C. in line 311, and a 50° C. temperature of wash liquids in lines 321, 322. The system illustrated in FIG. 3 is particularly useful in conjunction with a conventional low concentration screening assembly, which requires a thickening apparatus (such as a drum washer) where large heat losses are often unavoidable. In such a system the first pressure diffuser 301 functions as an effective thermal barrier.

Utilizing a system such as illustrated in FIG. 3 it is possible to obtain a marked improvement in wash efficiency compared to the same equipment with conventional liquid flow—i.e. with only one liquid discharge from each wash diffuser. The washing efficiency can theoretically be up to 40 percent better. The system according to the present invention also optimizes the counter-current wash effect so as to conserve most of the heat within the system. The displacement effect that takes place according to the present invention can be compared to the effect of a thermal battery.

It will thus be seen that according to the present invention an effective method for the treatment of a suspension with one or more treatment liquids has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and processes.

What is claimed is:

1. A method for washing a suspension, including an initial suspension liquid fraction, utilizing a washing liquid, comprising the steps of:
   (a) causing the suspension to flow with a given predetermined web thickness in a flow path having first and second sides;
   (b) adding washing liquid to the suspension flowing in the flow path from the first side thereof at a first predetermined position along the flow path;
   (c) at substantially said first predetermined position along the flow path withdrawing from the second side of the flow path initial suspension liquid displaced by said washing liquid;
   (d) repeating steps (b) and (c) at a plurality of other predetermined spaced consecutive positions along said flow path;
   the washing liquid added at the first predetermined position in step (b), and at the other positions along said flow path, being supplied by withdrawn wash liquid withdrawn from a position at least two of said consecutive positions further down along said flow path, except for the last two of said consecutive positions wherein the washing liquid is fresh washing liquid; and the liquid withdrawn at any particular position along said flow path being supplied as washing liquid at only a single other previous position along said flow path; and
   the liquid withdrawn from the first predetermined position along the flow path, in step (c), consisting essentially of initial suspension liquid.

2. A method as recited in claim 1 wherein said flow path is essentially vertically downwardly.

3. A method as recited in claim 1 wherein step (d) is practiced so that the liquid fraction of the suspension in the flow path downstream of the last of said predetermined points is composed primarily of treatment liquid added at said last predetermined point.

4. A method as recited in claim 1 wherein step (a) is practiced so that the flow path has a substantially annular cross-section.

5. A method as recited in claim 4 wherein said first side is a radially inward side of the flow path, and wherein said second side is a radially outward side of said flow path.

6. A method as recited in claim 4 wherein said second side is a radially inward side of the flow path, and wherein said first side is a radially outward side of said flow path.

7. A method as recited in claim 1 wherein steps (a) through (d) are practiced at super-atmospheric pressure and at a temperature greater than about 100° C.

8. A method as recited in claim 1 wherein steps (a) through (d) are practiced so that the suspension concentration is maintained substantially constant throughout the flow path.

9. A method as recited in claim 1 wherein said flow path is a first flow path, and comprising the further steps of:
   (e) causing the suspension to exit the first flow path and flow in a second flow path with a given web thickness, and having first and second sides;
   (f) adding washing liquid to the suspension flow in the second flow path from the first side thereof at a first predetermined position along the second flow path;
   (g) at substantially said first predetermined position along the second flow path withdrawing liquid displaced by said washing liquid from the second side of the second flow path;
   (h) repeating steps (f) and (g) at a plurality of other predetermined space consecutive positions along said second flow path and the liquid withdrawn at any particular position along said second flow path being supplied as washing liquid at only a single other previous position along said second flow path; and
   wherein the treatment liquid added in step (b) is the withdrawal liquid from step (g).

10. A method as recited in claim 9 comprising the further step of passing the withdrawal liquid from step (g) through a heat exchanger before introducing it as the treatment liquid in step (b).

11. A method as recited in claim 9 comprising the further step of mixing the suspension as it flows between the first and second flow paths.

12. A method as recited in claim 1 wherein steps (b)–(d) are practiced so that the liquid withdrawn from the last predetermined point along the flow path contains essentially no treatment liquid added at said last predetermined point.

13. A method for treating a pulp, including an initial pulp liquid fraction, utilizing treatment liquid, comprising the steps of:
   (a) causing the pulp to flow with a given predetermined web thickness in a first flow path having first and second sides;
   (b) adding treatment liquid to the pulp flowing in the flow path from the first side thereof at a first predetermined position along the flow path;
   (c) at substantially said first predetermined position along the flow path withdrawing from the second said of the flow path initial pulp liquid displaced by said treatment liquid; and
   (d) repeating steps (b) and (c) at at least one other predetermined position along said first flow path;
   (e) causing the pulp to exit the first flow path and flow in a second flow path with a given web thickness, and having first and second sides;

(f) adding treatment liquid to the pulp flowing in the second flow path from the first side thereof at a first predetermined position along the second flow path;

(g) at substantially said first predetermined position along the second flow path withdrawing liquid displaced by said treatment liquid from the second side of the second flow path;

(h) repeating steps (f) and (g) at at least one other predetermined position along said second flow path; and wherein the treatment liquid added in step (b) is the withdrawal liquid from step (g), and wherein the treatment liquid for at least one position along said first flow path and said second flow path is provided by treatment liquid withdrawn from a position at least two consecutive positions further down along said first flow path, or said second flow path, respectively, except for the last two of said consecutive positions wherein the treatment liquid is fresh treatment liquid; and wherein the liquid withdrawn at any particular position along said flow paths is supplied as treatment liquid at only a single other previous position along said flow paths.

14. A method as recited in claim 13 wherein the pulp concentration is between about 7-15 percent, and its concentration is maintained substantially constant throughout steps (a) through (d).

15. A method as recited in claim 13 wherein said web thickness is maintained between about 50-500 mm.

16. A method as recited in claim 14 wherein said web thickness is maintained between about 50-500 mm.

17. A method as recited in claim 16 wherein said flow path is essentially vertically downwardly.

18. A method as recited in claim 17 wherein steps (a) through (d) are practiced at super-atmospheric pressure and at a temperature greater than about 100° C.

19. A method as recited in claim 13 wherein the liquid withdrawn in step (g) is passed through a heat exchanger for cooling before introducing it as the treatment liquid in step (b) and the liquid withdrawn in step (h) is passed through said heat exchanger for heating before introducing it as the treatment liquid added in step (d).

* * * * *